United States Patent [19]

Gaulke et al.

[11] Patent Number: 5,083,308
[45] Date of Patent: Jan. 21, 1992

[54] ARRANGEMENT FOR DETERMINING SWITCH PORT STATUS AT AN ADJUNCT PROCESSOR

[75] Inventors: David A. Gaulke, Westminster; Thomas M. O'Dell, Longmont; Ricky L. Overmyer, Golden, all of Colo.

[73] Assignee: AT&T Bell Laboratories, Murray Hill, N.J.

[21] Appl. No.: 502,213

[22] Filed: Mar. 30, 1990

[51] Int. Cl.5 .............................................. H04M 3/22
[52] U.S. Cl. .................................... 379/381; 379/377; 379/384; 379/10; 379/89; 379/201; 379/34; 379/337; 379/266
[58] Field of Search ............... 379/377, 381, 383, 384, 379/11, 10, 67, 88, 89, 201, 337, 334, 333, 34, 265, 266, 92

[56] References Cited

U.S. PATENT DOCUMENTS

| | | | |
|---|---|---|---|
| 3,420,960 | 1/1969 | Jacoby et al. | 379/381 |
| 3,701,855 | 10/1972 | Reynolds | 379/381 X |
| 3,927,271 | 12/1975 | Acevedo | 379/381 X |
| 4,002,849 | 1/1977 | Kotler et al. | 379/384 X |
| 4,078,158 | 3/1978 | Houée et al. | 379/383 X |
| 4,201,896 | 5/1980 | Bower et al. | 379/381 X |
| 4,255,624 | 3/1981 | Walton et al. | 379/11 |
| 4,446,338 | 5/1984 | Rosch | 379/383 X |
| 4,623,760 | 11/1986 | Binkerd et al. | 379/377 X |
| 4,893,248 | 1/1990 | Pitts et al. | 379/92 X |
| 4,922,520 | 5/1990 | Bernard et al. | 379/92 X |

Primary Examiner—James L. Dwyer
Assistant Examiner—Magdy W. Shehata
Attorney, Agent, or Firm—David Volejnicek

[57] ABSTRACT

An arrangement that enables an adjunct processor to determine the service status of switching system communication ports to which the adjunct processor is connected, without reliance on switch-to-adjunct status-conveying messages. In-service and idle ones of the ports participate in calls on a rotating basis. Following receipt of N calls, where N is the number of in-service ports connected to the adjunct processor, the arrangement determines whether each port that is presently designated as being in-service and idle has participated in one communication before a port has participated in a second communication. The arrangement then treats as out-of-service any port presently designated as being in-service that has been so determined a predetermined number of sequential times. It also selectively designates as in-service ports that have participated in communications since the last determination had been made.

30 Claims, 4 Drawing Sheets

FIG. 3

ARRANGEMENT FOR DETERMINING SWITCH PORT STATUS AT AN ADJUNCT PROCESSOR

TECHNICAL FIELD

The invention relates generally to communication system adjunct processors, and specifically to interfaces between adjunct processors and communication switching systems.

BACKGROUND OF THE INVENTION

It is known to use adjunct processors in conjunction with communication switching systems to provide communication services in addition to those provided by the switching systems. An illustrative example thereof is the use of a voice message service system in conjunction with a switching system to allow callers to leave voice and call-back messages for called parties served by that switching system and to enable the called parties to retrieve those messages.

An adjunct processor is generally coupled to a switching system via one or more communication links, each one of which connects to a communication port of the switching system. The adjunct processor provides its services over those links. For its proper operation, the adjunct processor often needs to know the status of the connecting links and associated ports from the viewpoint of the switching system. For example, for outcalling—the automatic placing of calls to subscribers to notify them that they have messages waiting for them and to invite them to retrieve the waiting messages—a voice message service system needs to know which ports are considered by the switching system to be in-service and idle so that it can use those ports for outcalling, and which ports are not considered to be in-service and idle (e.g., are considered to be in-service but busy, or out-of-service) so that it can avoid using those ports for outcalling.

To make port status information available to adjunct processors, some switch-to-adjunct interfaces use communication protocols that include messages which allow the adjunct processor to inquire about, and to receive responses about, port status from the switching system. Other interfaces use protocols having only the status-reporting capability without the status-querying capability, allowing the switching system to automatically report port status to the adjunct processor at certain times, such as when a port's status changes. Yet other interfaces have neither a status-reporting nor a status-querying capability, but do allow the adjunct processor to toggle port status at the switching system by sending a command. Under ideal circumstances, these interfaces would be adequate. Under real circumstances, however, there is always the danger that occurrence of an error (e.g., failure of a communication link or loss of a message that is used for reporting port status) will cause the adjunct processor to possess incorrect port status information.

Yet other interfaces use protocols that provide no port-status reporting or toggling capability at all, and therefore leave the adjunct processors without the needed information. They also leave the switching system without means to determine the adjunct processors' view of port status. One such protocol is the widely-used SMSI protocol.

SUMMARY OF THE INVENTION

This invention is directed to solving these and other problems and disadvantages of the prior art. According to the invention, there is provided an arrangement that enables an adjunct processor to determine the status of communication ports to which the adjunct processor is connected, without reliance on switch-to-adjunct status-conveying messages. In-service ones of the ports participate in communications (e.g., calls) on a rotating basis, and the arrangement periodically determines whether each port that is designated as being in-service has participated in one communication before a port has participated in a second communication. Illustratively, the determination is made for idle ports only: if there are N ports that are considered by the adjunct processor to be in-service, and of those, K ports are presently considered to be idle, the arrangement makes a determination of whether each one of the K ports has participated in one communication, in response to occurrence of a group of at least N communications that are participated in by the plurality of ports. Based on the determination, the arrangement treats as out-of-service any port presently designated as being in-service that has been determined a predetermined number (one or more) of sequential times not to have participated in one communication before any other port has participated in a second communication. The arrangement also selectively designates as in-service any port that has participated in a communication since the last determination had been made. The arrangement thus tries to make sure that the adjunct processor's view of the service state of individual ports tracks the switching system's view of the service state of those ports.

These and other advantages of the present invention will become apparent from the following description of an illustrative embodiment of the invention taken together with the drawing.

DETAILED DESCRIPTION

Figure 1:
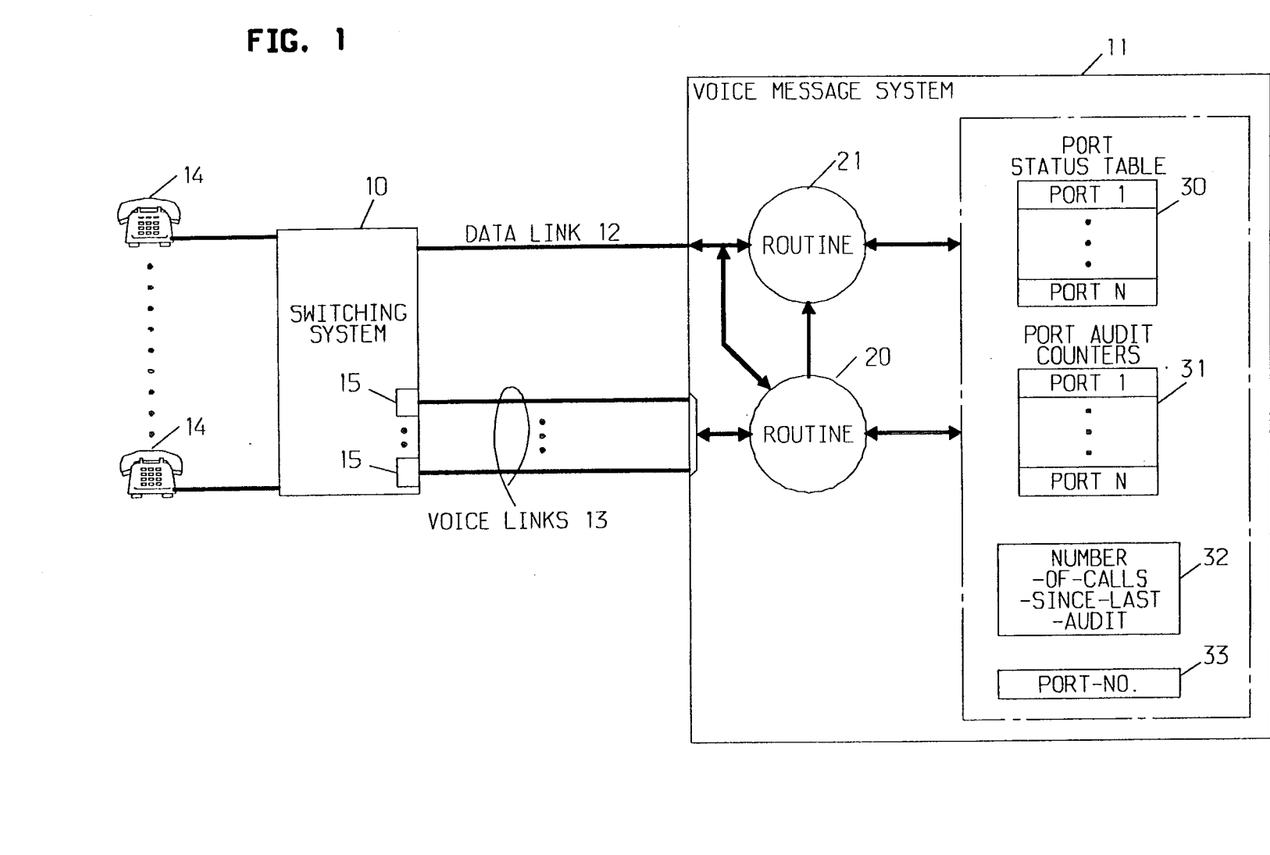
FIG. 1 is a block diagram of an illustrative communication system that includes an embodiment of the invention.

FIG. 1 shows an illustrative communication system that serves as an environment for the invention. A switching system 10, such as a telephone central office or a private branch exchange (PBX), provides communications services for a plurality of connected telephones 14 and their users. Services that are not provided directly by switching system 10 and its intelligence are provided indirectly via one or more applications processors that are connected to the switching system. One such service is a voice message service, provided by an applications processor aptly referred to as a voice message system 11. For purposes of this application, voice message system 11 is taken to be representative of all applications processors.

Voice message system 11 is connected to switching system 10 by a data link 12 and a plurality—a hunt group—of voice links 13. Each voice link 13 is connected to a different communication port 15 of switching system 10. Ports 15 and voice links 13 are used by voice message system 11 to receive call-back and voice message communications from callers for called parties, and for outcalling. Switching system 10 and voice message system 11 use data link 12 to communicate to each other control information and data pertaining to voice communications on voice links 13, in a conventional manner. Depending upon the particular protocol that is used for inter-system 10 and 11 control communications, switching system 10 may or may not send messages on data link 12 reporting the service status of ports 15 to voice message system 11. Illustratively, switching system 10 is a Northern Telecommunications Inc. SL-1 PBX and the protocol used on data link 12 is the Integrated Voice Messaging System (IVMS) protocol. The IVMS protocol provides a message which system 11 can send to system 10 to toggle the present service state of a port 15, but does not provide a message by which system 11 can either query system 10 about the present service state of a port 15 or direct system 10 to set the port 15 to a predetermined state.

System 11 includes a data structure, referred to as port status table 30. That has a plurality of indicator entries, one for each port 15, in which system 11 keeps a record of the present service state of ports 15. A port 15 can have any one of three service states: idle, i.e., in-service and free; call-in-progress, i.e., in-service and busy; and busied out, i.e., out-of-service. When system 11 receives a call on a link 13, or receives notification on link 12 of a call on a link 13, it marks that link's 13 corresponding port 15 in table 30 as being in the call-in-progress state. When the call terminates, system 11 marks that port 15 in table 30 as being in the idle state. When system 11 takes a port 15 out-of-service, e.g., for maintenance purposes, it marks that port 15 in table 30 as being in the busied-out state and, if possible, system 11 also sends a toggle message to system 10 to cause it to toggle its state of that port 15 to an out-of-service state.

System 10 keeps a similar data structure (not shown). In conventional operation, when switching system 10 wishes to connect a call to system 11, it searches its data structure for an idle port 15 through which it can direct that call to system 11. System 10 selects idle ports on a rotating—a round—robin or a least—recently—used—basis. This serves to spread calls over ports 15 relatively evenly. It also guarantees that one call is directed by system 10 through every in-service idle port 15 before a second call is directed through any one idle port 15. In this illustrative example, system 11 relies on this guarantee to determine the true service state of ports 15 from the viewpoint of system 10.

Figure 2:
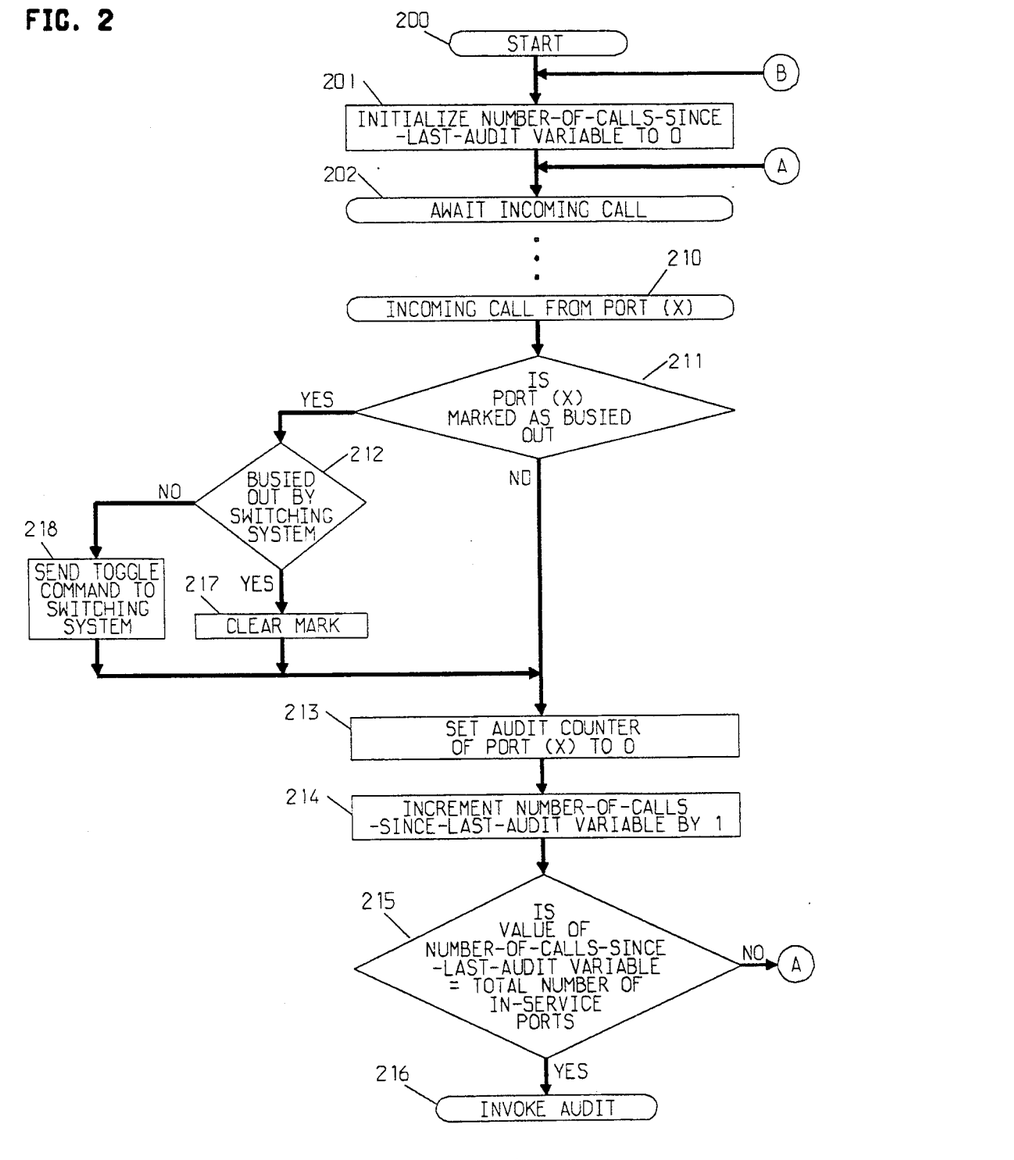
FIG. 2 is an operations flow diagram of a call-receipt routine of the voice message system of the communication system of FIG. 1.
Figure 3:
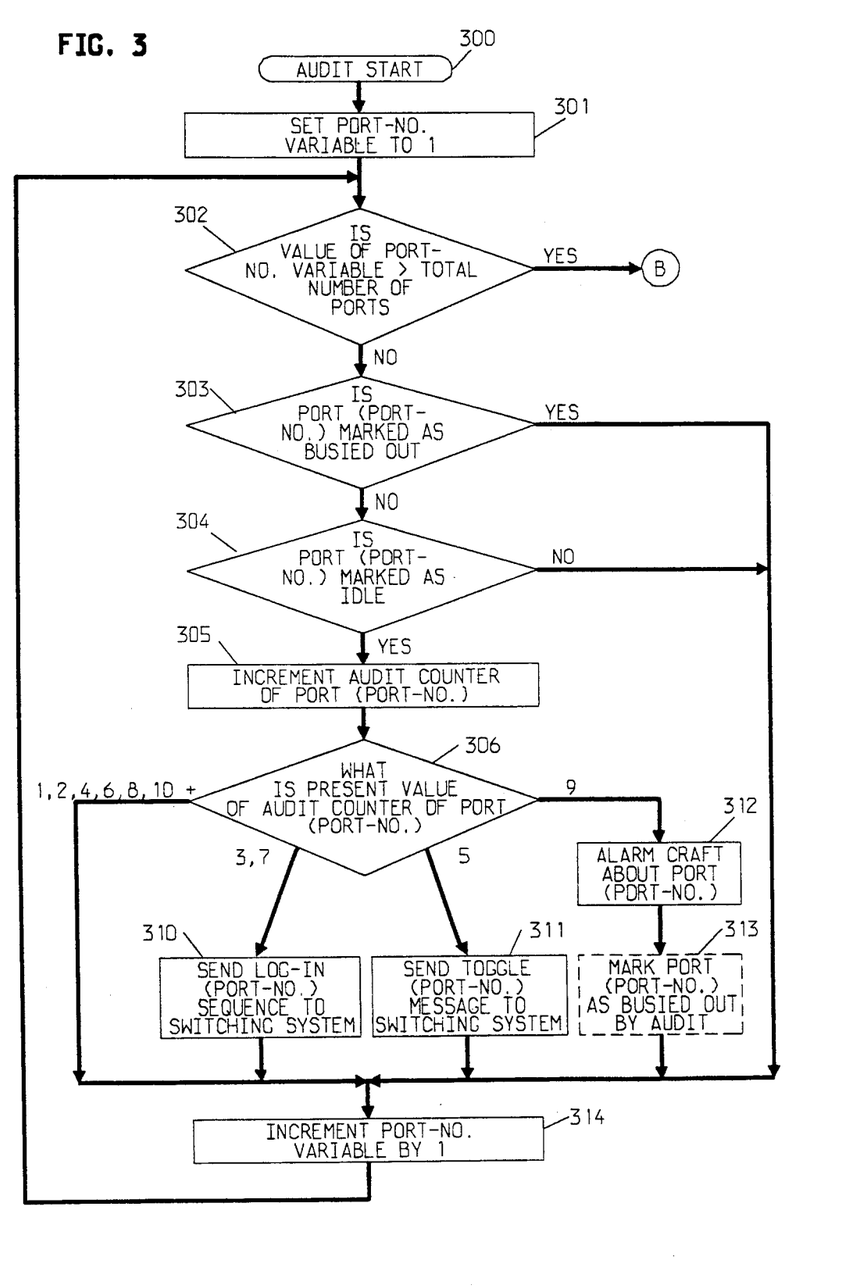
FIG. 3 is an operations flow diagram of a first embodiment of a port-status audit routine of the voice message system of the communication system of FIG. 1.
Figure 4:
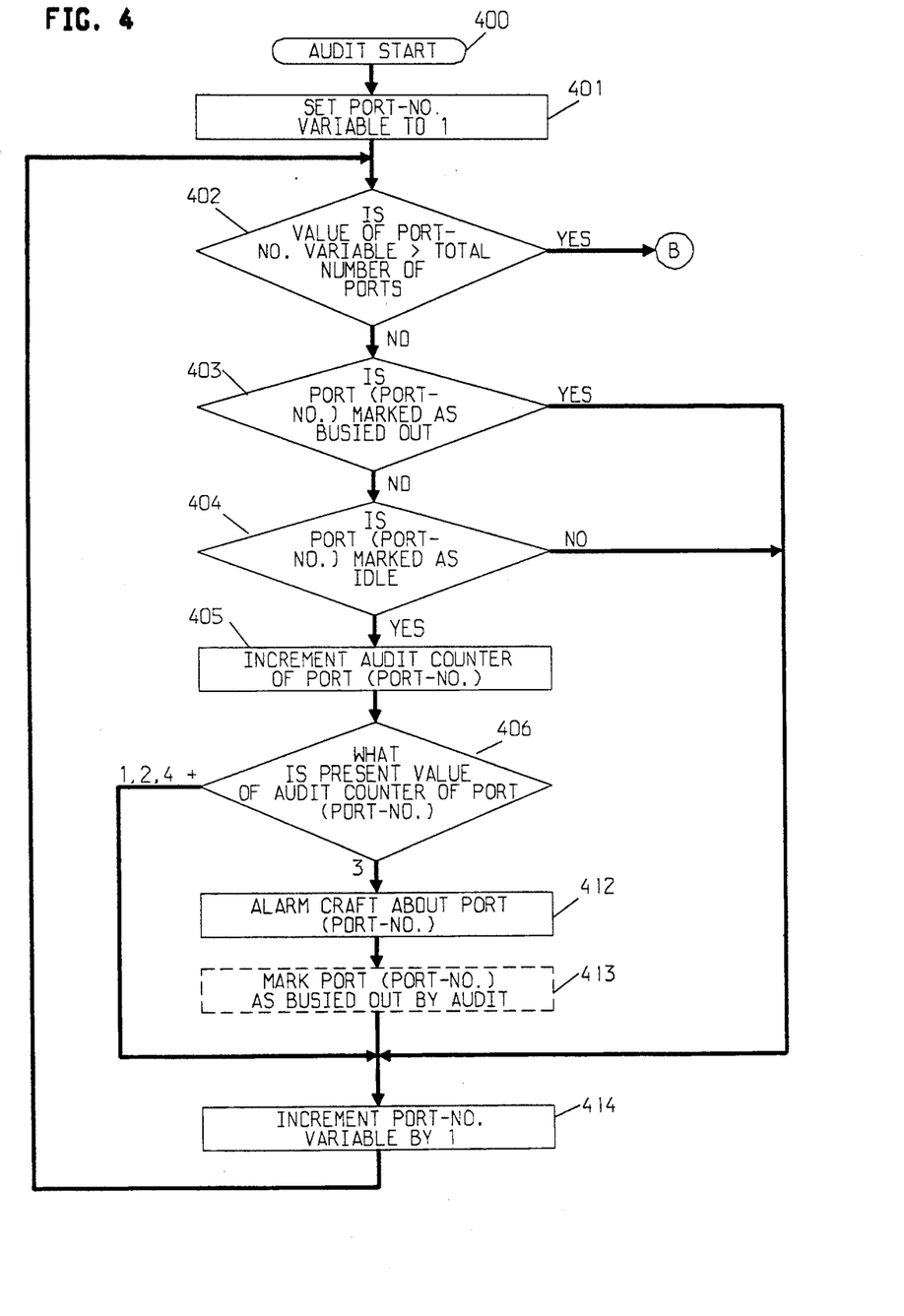
FIG. 4 is an operations flow diagram of a second embodiment of the port-status audit routine of the voice message system of the communication system of FIG. 1.

According to the invention, voice message system 11 includes a pair of routines 20, 21 and associated data structures 30-33 which it uses to determine the actual state of ports 15 from the viewpoint of switching system 10. Call-receipt routine 20 is performed each time a call is received on a voice link 13. It is shown in FIG. 2. Port-status audit routine 21 is performed periodically—only once every N calls where N is the number of in-service (from the viewpoint of system 11) ports 15 connected to system 11. One embodiment of routine 21 is shown in FIG. 3, and an alternative embodiment is shown in FIG. 4. Port station table 30 has already been described. Port audit counters 31 is a data structure having a plurality of indicator entries, one for each port 15, each counting the number of times that audit routine 21 has been executed on the corresponding port 15 since it was last in call-in-progress state. Number-of-calls-since-last-audit 32 is a variable that counts the total number of calls that have been received on voice links 13 since the last time that audit routine 21 has been executed. And port-no. 33 is a variable used by routine 21 to keep track of which port 15 it is presently auditing.

Turning to FIG. 2, execution of call-receipt routine 20 starts upon system 11 initialization, at step 200. Routine 20 initializes number-of-calls-since-last-audit variable 32 to zero, at step 201, and then waits for receipt of an incoming call on a link 13, at step 202. Receipt of a call from one of the ports 15—port X—at step 210, is an indication that switching system 10 considers that port 15 to have been in-service and idle and therefore capable of handling a new call. Receipt of this call may be announced to system 11 directly over voice link 13 that is connected to that one port 15, e.g., via ringing, or indirectly by receipt over data link 12 of a connect message that identifies the one port 15, and system 11 may respond to only one or to both types of announcements. In this illustrative embodiment, only the latter type is used. Routine 20 therefore checks port status table 30 to determine whether that port 15 is marked as busied out, i.e., out-of-service from the viewpoint of system 11, at step 211. If so, there is a mismatch in systems' 10 and 11 views of that port's status. Routine 20 therefore checks information stored with the mark, to determine if that port 15 was busied out by action of system 10, at step 212. If so, system 10 has obviously changed the port status again, because system 10 would-/could not send a call through a busied-out port 15. Consequently, routine 20 clears the mark, at step 217, to eliminate the mismatch, thereby marking that port 15 as being an in-service port 15. (A call-processing entity, not shown, of system 11 will mark that port 15 as having a call-in-progress, and later will mark that port as idle when the call is completed, in the conventional manner.) If that port 15 was not busied out by action of system 10, then it was busied out by independent action of system 11 (e.g., routine 21). Routine 20 therefore causes a port status toggle command to be sent to system 10, at step 218, to cause system 10 to also busy out that port 15 and thus become consistent with system's 11 view of that port's status.

Following step 217 or 218, or if the subject port 15 is not found marked in table 30 as busied out at step 211, routine 20 resets that port's audit counter in port audit counters 31 to zero, at step 213, to indicate that a call has been received from this port 15 since a port-status audit has last been executed. Routine 20 then increments the number-of-calls-since-last-audit variable 32 by one, at step 214, to account for the just-received call. Routine 20 then checks the value of variable 32 against port status table 30 contents to determine whether the value of variable 32 equals the number of "available", i.e., in-service, ports 15 that are connected to system 11, at step 215. If not, it is not time yet to perform the next port status audit, so routine 20 returns to step 202 to await receipt of the next call. If so, it means that a group of sufficiently many calls to justify an audit has been received, and so routine 20 invokes execution of port-status audit routine 21, at step 216.

A first embodiment of audit routine 21 is shown in FIG. 3. Upon its invocation, at step 300, routine 21 initializes port-no. variable 33 to one, at step 301. Routine 21 then checks whether the value of variable 33 exceeds the total number of ports 15 that are connected to system 11, at step 302. If so, it means that routine 21 has completed auditing all ports 15. Routine 21 therefore exits and returns program execution to step 201 of routine 20. In response, routine 20 resets number-of-calls-since-last-audit variable 32 to zero and then returns to await receipt of the next call on links 13, or notification thereof on link 12.

If audit of all ports 15 has not been completed, as determined at step 302, routine 20 checks port status table 30 to determine whether the port 15 pointed to by port-no. variable 33 is marked as being busied out, at step 303. If so, the port is out-of-service and no further processing is required for this port 15, so routine 21 proceeds to step 313 to increment port-no. variable 33 by one, and then returns to step 302. If the subject port 15 is not marked as being busied out at step 303, routine 21 checks whether the port is marked as being idle, at step 304. If not, the port is in-service and busy (has a call in progress) and no further processing is required for this port, so routine 21 again proceeds to step 313. But if the port is marked as being idle, there is a possibility of a mismatch between the views of systems 10 and 11 of the state of that port: while system 11 considers the port idle and hence in-service and usable for a call, system 10 may consider the port to be in-service but busy or out-of-service and hence unusable for a new call. An audit of the true state of the port must therefore be completed. Routine 21 increments that port's audit counter in port audit counters 31, at step 305, to record the performance of this audit. Routine 21 then determines the value of the port's audit counter, at step 306.

If the value is 1, it means that the port's audit counter has been reset at step 213 by receipt of a call from that port 15 since the last audit or that the port had had a call in progress during the last audit, and hence no mismatch appears to exist in the systems' 10 and 11 views of the port's service status. Routine 21 therefore proceeds to step 314.

If the value is 2, it means that a call has not been received on this port 15 since the last audit. Due to the port-use rotation guarantee discussed above, this indicates likelihood of a mismatch in the systems 10 and 11 views of the port service status, and hence makes the indicated service status suspect. However, the mismatch may be only temporary and will clear itself automatically. System 11 therefore ignores it for the time being and proceeds to step 314.

If the value is 3, it means that a mismatch does exist and has not been cleared up. In case the mismatch is the result of a failure to conventionally log in that port 15 with the remote entity that is connected to that port 15 (system 10 in this example), routine 21 causes system 11 to send to system 10 on data link 12 a conventional IVMS protocol port log-in sequence designating that port 15, at step 310, in order to toggle that port's log-in status. Routine 21 then proceeds to step 314.

If the port audit counter value is 4, its meaning is the same as that of value 2 discussed above, and routine 21 proceeds to step 314.

If the value is 5, it means that the log-in sequence sent at step 310 failed to clear up the mismatch. This may be due to the state of the port being out-of-service from the viewpoint of system 10. Routine 21 therefore causes system 11 to send to system 10 on data link 12 a conventional IVMS protocol toggle message designating that port 15, at step 311, to invert the state of the port 15 at system 10 in order to place it in an in-service state.

If the value is 6, its meaning is the same as that of value 2 discussed above, and routine 21 proceeds to step 314.

If the value is 7, it means that, while the toggle message sent at step 311 may have placed the port in an in-service state, the port may not be logged in with system 10 because the log-in sequence that followed the port audit counter value of 3 logged out port 15 that was already logged in. Routine 21 therefore proceeds to step 310 to send another port log-in sequence.

If the value is 8, its meaning is the same as that of value 2 discussed above, and routine 21 proceeds to step 314.

If the value is 9, it means that the existing mismatch has successfully resisted all attempts to eliminate it in favor of system 11's view. Routine 21 therefore raises an alarm to notify the craft of a problem with this port, at step 312, and treats the port as a busied out port, thus eliminating the mismatch in favor of system 10's view. Preferably, routine 21 also marks the subject port 15 in port status table 30 as being busied out by port audit, at step 313, for example, so as to avoid using the port for outcalling. At this point, routine 21 then proceeds to step 314.

If the value of the port audit counter is 10 or more, it means that the port has been marked as being busied out, and nothing else remains to be done. Routine 21 therefore proceeds to step 314.

In this manner, system 11 is able to detect and eliminate any mismatches in its and system 10's views of the states of ports 15.

Alternatively, to avoid the possibility of audit counter overrun, which may result in the counter becoming reset, routine 21 may check whether the audit counter value is 10, prior to step 305, and if so, skip step 305.

FIG. 4 shows an alternative implementation of routine 21. This implementation is illustratively suited for use with switch-to-adjunct communication protocols that have less inter-system 10 and 11 communication capability than the IVMS protocol—the SMSI protocol, for example. This implementation takes cognizance of the fact that port log-in sequences and toggle messages may not be, or are not, available for trying to influence system 10's viewpoint of port 15 status. Steps 400–406 and 412–414 correspond to steps 30–306 and 312–314, respectively, of FIG. 3. In FIG. 4, the treatment accorded to port audit counter values 1, 2, and 4 is the same as that in FIG. 3; the treatment accorded to value 3 is the same as that accorded to value 9 in FIG. 3; and the treatment accorded to values greater than 4 is the same as that accorded to values 10 and higher in FIG. 3.

Of course, it should be understood that various changes and modifications may be made to the above-described illustrative embodiment of the invention. For example, if the first suspicion of a mismatch were to be treated as a mismatch, port audit counters could be replaced by simple bi-state flags. Also, the port status audit routine may be executed more or less often than after receipt of every group of N calls. Such changes and modifications may be made without departing from the spirit and the scope of the invention. It is therefore intended that such changes and modifications be covered by the following claims.

We claim:

1. An arrangement for determining actual service states of individual ones of a plurality of communication ports that have designated service states, wherein ones of the ports that are actually in service participate in communications on a rotating basis, comprising:
    means for periodically determining whether each port designated as being in-service has participated in one most-recent communication before a port has participated in a second most-recent communication; and
    means cooperative with the determining means for treating as being actually out-of-service any port presently designated as being in-service that has been determined a predetermined number of sequential times to have not participated in one most-recent communication before a port has participated in a second most-recent communication.

2. The arrangement of claim 1 wherein the treating means are further for designating as being in-service a port that has participated in a communication since a last determination by the determining means.

3. The arrangement of claim 1 for determining service states of individual ones of N ports designated as being in service, where N is a positive integer, wherein the determining means comprise
    means repeatedly responsive to occurrence of individual groups of at least N most-recent communications participated in by the ports, for determining whether each port designated as being in-service has participated in one most-recent communication before a port has participated in a second most-recent communication.

4. The arrangement of claim 3 wherein
    the treating means comprise
    means for designating as being in-service any port that has participated in a communication during occurrence of a most-recent one of the communications groups.

5. The arrangement of claim 1 for determining actual service states of individual ones of N ports designated as being in service, where N is a positive integer, wherein
    the determining means comprise
    means responsive to occurrence of at least N most-recent communications participated in by the ports, for determining whether each port designated as being in-service has participated in one most-recent communication before a port has participated in a second most-recent communication.

6. The arrangement of claim 1 wherein
    ones of the ports that are designated as being in-service comprise ports designated as being idle and ready to participate in communications and ports designated as being busy and presently participating in communications, and
    the determining means periodically determine whether each port designated as being in-service and idle has participated in one most-recent communication before a port has participated in a second most-recent communication.

7. The arrangement of claim 1 for determining actual service states of individual ones of N ports designated as being in service, including K ports that are indicated to be in-service and idle, where N and K are positive integers, wherein the determining means comprise
    means responsive to occurrence of at least N most-recent communications participated in by the plurality of ports, for determining whether each one of the K ports has participated in one of the at least N most-recent communications.

8. An arrangement for determining service status of individual ones of a plurality of communication ports wherein communications are received through in-service and idle ones of the ports on a rotating basis, comprising:
    first means for indicating service states of individual ones of the ports, selectively responsive to receipt of a communication through one of the ports for indicating the one port to be in-service;
    second means for indicating receipt of communications through individual ones of the ports, responsive to receipt of the communication through the one of the ports for indicating that the communication has been received through the one port;
    third means cooperative with the first and the second means and responsive to receipt of at least N communications from the ports, where N is a number of the ports that are indicated by the first means to be in-service, for determining which ones of the ports are both (a) presently indicated by the first means to be in-service and idle and (b) not indicated by the second means to have had communications received therethrough; and
    fourth means cooperative with the third means for treating as being out-of-service any port that has been determined by the third means to be both (a) and (b) a predetermined number of times.

9. The arrangement of claim 8 wherein the fourth means comprise
    means for causing the first means to indicate as being out-of-service any port that has been determined to be both (a) and (b) a predetermined number of times.

10. The arrangement of claim 8 wherein
    the second means are resettable means, when reset responsive to receipt of the communication through the one of the ports for indicating that the communication has been received through the one port;
    the third means include means repeatedly responsive to receipt of individual groups of at least N communications through the ports for determining which ones of the ports are both (a) and (b), and for resetting the second means following each determination; and
    the fourth means are for causing the first means to indicate as being out-of-service any port that has been determined by the third means to be both (a) and (b) a predetermined number of sequential times.

11. The arrangement of claim 10 wherein
    the fourth means include:
    means for causing a remote entity, connected to the arrangement through a port that has been determined by the third means to be both (a) and (b) a first predetermined number of sequential times, to toggle a remote state of the connected port; and
    means for treating as being out-of-service any port that has been determined by the third means to be both (a) and (b) a second predetermined number of sequential times that is greater than the first predetermined number.

12. The arrangement of claim 10 wherein the fourth means include means for logging in a port, that has been determined by the third means to be both (a) and (b) a first predetermined number of sequential times, with a remote entity connected to the arrangement through the connected port;

means for causing a remote entity, connected to the arrangement through a port that has been determined by the third means to be both (a) and (b) a second predetermined number of sequential times that is greater than the first predetermined number, to toggle a remote state of the connected port;

means for logging in a port, that has been determined by the third means to be both (a) and (b) a third predetermined number of sequential times that is greater than the second predetermined number, with a remote entity connected to the arrangement through the connected port; and means for treating as being out-of-service any port that has been determined by the third means to be both (a) and (b) a fourth predetermined number of sequential times that is greater than the third predetermined number.

13. An arrangement for determining service states of individual ones of a plurality of communication ports, wherein communications are received through in-service and idle ones of the ports on a rotating basis, comprising:

a plurality of first indicating means, one corresponding with each port for indicating a service state of the corresponding port;

a plurality of resettable second indicating means, one corresponding with each port and when reset for indicating receipt of a communication through the corresponding port;

third means responsive to receipt of a communication through one of the ports, for selectively causing the one port's corresponding first indicating means to indicate an in-service state and for resetting the one port's corresponding second indicating means;

fourth means repeatedly responsive to receipt of individual groups of at least N communications through the ports, where N is a number of the ports that are presently indicated by their first indicating means to be in-service, for determining as suspect those ports which have corresponding first indicating means indicating an in-service and idle state and also have corresponding second indicating means set, and for setting reset second indicating means; and fifth means for causing the first indicating means, corresponding with any idle port that is determined by the fourth means to be suspect a predetermined number of sequential times, to indicate an out-of-service state.

14. The arrangement of claim 13 wherein
each second indicating means comprises a resettable counter;

the fourth means comprise means for determining as suspect those ports which have corresponding first indicating means indicating an in-service and idle state and also have corresponding counters not reset, and incrementing the counters; and the fifth means comprise sixth means for causing the first indicating means, corresponding with any idle port whose corresponding counter reaches a predetermined count, to indicate an out-of-service state.

15. The arrangement of claim 14 wherein the fifth means comprise:
means for logging in an idle port, whose corresponding counter reaches a first predetermined count, with a remote entity connected to the arrangement through the corresponding port;

means for causing a remote entity, connected to the arrangement through an idle port whose corresponding counter reaches a second predetermined count higher than the first count, to toggle a remote state of the connected port;

means for logging in an idle port, whose corresponding counter reaches a third predetermined count higher than the second count, with a remote entity connected to the arrangement through the corresponding port; and the sixth means cause the first indicating means, corresponding with any idle port whose corresponding counter reaches a fourth predetermined count higher than the third count, to indicate an out-of-service state.

16. A method of determining actual service states of individual ones of a plurality of communication ports that have designated service states, wherein ones of the ports that are actually in service participate in communications on a rotating basis, comprising the steps of:

periodically determining whether each port designated as being in-service has participated in one most-recent communication before a port has participated in a second most-recent communication; and treating as being actually out-of-service any port presently designated as being in-service that has been determined a predetermined number of sequential times to have not participated in one most-recent communication before a port has participated in a second most-recent communication.

17. The method of claim 16 further comprising the step of:

designating as being in-service a port that has participated in a communication since a last determination.

18. The method of claim 16 for determining service states of individual ones of N ports designated as being in service, where N is a positive integer wherein the step of periodically determining comprises the step of determining whether each port designated as being in-service has participated in one most-recent communication before a port has participated in a second most-recent communication, in repeated response to occurrence of individual groups of at least N most-recent communications participated in by the ports.

19. The method of claim 18 wherein
the step of designating a port as being in-service comprises the step of designating as being in-service any port that has participated in a communication during occurrence of a most-recent one of the communications groups.

20. The method of claim 16 for determining actual service states of individual ones of N ports designated as being in service, where N is a positive integer, wherein the step of periodically determining comprises the step of determining whether each port designated as being in-service has participated in one most-recent communication before a port has participated in a second most-recent communication, in response to occurrence of at least N most-recent communications participated in by the ports.

21. The method of claim 16 wherein
ones of the ports that are designated as being in service comprise ports designated as being idle and ready to participate in communications and ports designated as being busy and presently participating in communications, and
the step of periodically determining comprises the step of
periodically determining whether each port designated as being in-service and idle has participated in one most-recent communication before a port has participated in a second most-recent communication.

22. The method of claim 16 for determining actual service states of individual ones of N ports designated as being in service, including K ports that are indicated to be in-service and idle, where N and K are positive integers, wherein
the step of periodically determining comprises the step of
determining whether each one of the K ports has participated in one of at least N most-recent communications participated in by the plurality of ports, in response to occurrence of the at least N most-recent communications.

23. A method of determining service states of individual ones of a plurality of communication ports wherein communications are received through in-service and idle ones of the ports on a rotating basis, comprising the steps of:
selectively indicating a port as being in-service, in response to receipt of a communication through the port;
indicating receipt of the communication through the port, in response to receipt of the communication through the port;
determining which ones of the ports are both (a) indicated to be in-service and idle and (b) not indicated to have had communications received therethrough, in response to receipt of at least N communications from the ports, where N is a number of the ports that are indicated to be in-service; and
treating as being out-of-service any port that has been determined to be both (a) and (b) a predetermined number of times.

24. The arrangement of claim 23 wherein
the step of treating comprises the step of
indicating to be out-of-service any port that has been determined to be both (a) and (b) a predetermined number of times.

25. The method of claim 23 wherein
the step of indicating receipt comprises the step of
setting a resettable indicator corresponding to the port; and
the step of determining comprises the steps of
determining which ones of the ports are both (a) and (b), in repeated response to receipt of individual groups of at least K communications through the ports, and
resetting resettable indicators corresponding to the ports, following each determination; and
the step of treating a port as being out-of-service comprises the step of
treating as being out-of-service any port that has been determined to be both (a) and (b) a predetermined number of sequential times.

26. The method of claim 25 wherein
the step of treating a port as being out-of-service comprises the steps of:
causing a remote entity, connected to a port that has been determined to be both (a) and (b) a first predetermined number of sequential times, to toggle a remote state of the connected port; and
treating as being out-of-service any port that has been determined to be both (a) and (b) a second predetermined number of sequential times that is greater than the first predetermined number.

27. The method of claim 25 wherein
the step of treating a port as being out-of-service comprises the steps of:
logging in a port, that has been determined to be both (a) and (b) a first predetermined number of sequential times, with a remote entity connected to the port;
causing a remote entity, connected to a port that has been determined to be both (a) and (b) a second predetermined number of sequential times that is greater than the first predetermined number, to toggle a remote state of the connected port;
logging in a port, that has been determined to be both (a) and (b) a third predetermined number of sequential times that is greater than the second predetermined number, with a remote entity connected to the port; and
treating as being out-of-service any port that has been determined to be both (a) and (b) a fourth predetermined number of sequential times that is greater than the third predetermined number.

28. A method of determining service states of individual ones of a plurality of communications ports wherein communications are received through in-service and idle ones of the ports on a rotating basis, comprising the steps of:
selectively causing a first indicator, corresponding to a port and for indicating a service state of the corresponding port, to indicate an in-service state, in response to receipt of a communication through the corresponding port;
resetting a second indicator, corresponding to the port and when reset for indicating receipt of a communication through the corresponding port, in response to the receipt of the communication through the corresponding port;
determining as suspect those idle ports which have corresponding first indicators indicating an in-service and idle state and also have corresponding second indicators set, in repeated response to receipt of individual groups of at least N communications through the ports, where N is a number of the ports that are presently indicated by their first indicators to be in-service;
setting reset second indicators, in response to each performance of the determining step; and
causing the first indicator, corresponding with any idle port that is determined to be suspect a predetermined number of sequential times, to indicate an out-of-service state.

29. The method of claim 28 wherein
the step of resetting a second indicator comprises the step of resetting a resettable counter;
the step of setting reset second indicators comprises the step of
incrementing the counters; and the second step of causing the first indicator to indicate an out-of-service state comprises the step of causing the first indicator, corresponding with any idle port whose corresponding counter reaches a predetermined count, to indicate an out-of-service state.

30. The method of claim 29 wherein the step of causing the first indicator corresponding with any idle port that is determined to be suspect a predetermined number of sequential times to indicate an out-of-service state comprises the steps of:

logging in an idle port, whose corresponding counter reaches a first predetermined count, with a remote entity connected to the corresponding port;

causing a remote entity, connected to an idle port whose corresponding counter reaches a second predetermined count higher than the first count, to toggle a remote state of the connected port;

logging in an idle port, whose corresponding counter reaches a third predetermined count higher than the second count, with a remote entity connected to the corresponding port; and causing the first indicator corresponding with any idle port whose corresponding counter reaches a fourth predetermined count higher than the third count, to indicate an out-of-service state.

* * * * *